United States Patent [19]
Wood, deceased et al.

[11] 3,818,293
[45] June 18, 1974

[54] SPEED CONTROL DEVICE FOR BATTERY POWERED ELECTRIC VEHICLES

[76] Inventors: Philip Sheridan Wood, deceased, late of Bal Harbour, Fla.; by Garlin W. Lewis, administrator, 4302 San Amaro Dr., Coral Gables, Fla. 33146

[22] Filed: Mar. 6, 1973

[21] Appl. No.: 334,452

Related U.S. Application Data
[63] Substitute for Ser. No. 815,776, April 14, 1969, abandoned.

[52] U.S. Cl................ 318/139, 318/305, 318/295, 318/348, 318/550
[51] Int. Cl............................................. H02p 5/08
[58] Field of Search........... 318/139, 249, 549, 550, 318/347, 348, 349, 305, 249, 291, 293, 295

[56] References Cited
UNITED STATES PATENTS
1,976,512  10/1934  Ponsonby........................... 318/549
2,267,381  12/1941  Ulinsky.............................. 318/349
3,223,908  12/1965  Hutchinson........................ 318/139
3,299,338  1/1967   Toril.................................. 318/249
3,716,768  2/1973   Mason............................... 318/349

Primary Examiner—Bernard A. Gilheany
Assistant Examiner—Thomas Langer
Attorney, Agent, or Firm—Lane, Aitken, Dunner & Ziems

[57] ABSTRACT

A resistance speed control for a battery driven electric vehicle, such as a golf cart. A combination of solenoid switching and a direct mechanical switching is employed to vary the total resistance in series with the electric motor of the vehicle. When the vehicle is placed in reverse and the accelerator pedal is fully depressed, the control automatically produces a slow backward speed to avoid the safety hazard of unexpectedly lurching backwards.

4 Claims, 2 Drawing Figures

PATENTED JUN 18 1974 3,818,293

SPEED CONTROL DEVICE FOR BATTERY POWERED ELECTRIC VEHICLES

BACKGROUND OF THE INVENTION

The present invention relates to electric motor speed control devices, and more particularly to a speed control device for controlling the speed of a battery operated electric vehicle, such as a golf cart.

In prior art speed control devices for golf carts, the resistance in series with the motor was varied to vary the current flow to the motor to control the speed of the golf cart. Electric switches were provided for varying the resistance which created severe arcing problems in certain positions of the switches. Because of this arcing problem solenoids were used to provide a quicker contact making and breaking action and to conceal any resulting arc in the can or housing surrounding the solenoid contacts. This has lead to the use of a large number of solenoids, including at least one for each change in resistance. In one prior art control device, as many as twenty-one different solenoids are employed.

The batteries used in electric golf carts normally provide about thirty-six volts. A substantial portion of this voltage is required to energize the solenoids referred to above. Consequently, the solenoids represent a severe drain on the battery current, and when the battery voltage drops below the voltage required to energize the solenoids the vehicle is rendered inoperative. Many golf carts have been stranded on the golf course and have had to be towed back because of this condition.

Another problem with prior art golf carts results from their performance in reverse. When an inexperienced operator switches the motor to reverse and depresses the accelerator pedal to start backing up, they often lurch backwards. This causes them to automatically depress the accelerator pedal to the floor which results in the golf cart racing backwards unexpectedly and out of control. Many people have been injured by golf carts backing up in this manner, particularly in congested areas, such as around the crowded first tee of a golf course.

BRIEF SUMMARY OF THE INVENTION

In accordance with the present invention the aforementioned disadvantages of the prior art are overcome by providing a speed control device which employs a unique switching arrangement for adding resistances in parallel with one another to control the speed of the golf cart. As the number of resistors connected in parallel increases, the overall resistance in series with the motor decreases to increase the speed of the motor. The worst arcing takes place in switching the resistor or resistors in and out of the low speed position of the golf cart and the arcing problem progressively diminishes in the higher speed positions.

The switch of the present invention employs a power slide bar actuated directly by the accelerator pedal which sequentially engages a plurality of contacts to directly connect additional resistors in the circuit for the higher speed positions. However, in the first speed position, and also preferably in the second speed position, the resistors are switched in and out of the circuit by solenoid actuated contacts. The solenoids are connected in a secondary lower voltage circuit and are controlled by micro switches positioned in the path of the power slide bar so as to be cam actuated thereby.

In accordance with an important feature of the invention, when the power slide bar is moved to the high speed position by fully depressing the accelerator pedal, a shunt line is connected in parallel with the parallel connected resistors to effectively shunt them out and supply full power to the motor. In this same high speed position the micro switch for controlling the first speed position is automatically cammed open by the power slide bar to de-energize the solenoid controlled thereby. This eliminates the un-necessary drain on the battery that would be created if the solenoid were allowed to remain energized in the high speed position as in the prior art golf carts. When a second solenoid and micro switch are employed for controlling the second speed position, the second micro switch is electrically interlocked with the first micro switch so that it too is deactivated in the fully depressed high speed position to de-energize its solenoid.

By providing at least one or more speed positions wherein a direct switching action is employed which does not rely on the solenoid switching action, another very important advantage is obtained. In the event the battery voltage drops after extensive use of the golf cart to a point where it is no longer sufficient to energize the solenoids, the golf cart will not automatically be disabled. Only the first speed, if one solenoid is employed, or the second speed if two solenoids are employed, will be lost and the golf cart can continue to be operated at the higher speeds. The loss of the first and second speeds will serve as a warning to the golfer that the batteries are getting low.

By adding and subtracting resistor in parallel with one another to control the speed of the electric motor, overheating of the resistors is minimized because the current is divided among the plurality of resistors rather than being concentrated in one resistor, or a portion of one large resistor, as in prior art golf carts. Also any number of speeds can be obtained by simply providing additional resistors. In the preferred embodiment, five forward speeds are provided by employing four resistors and one shunt line. In the first speed position, the first resistance is connected in series with the motor, in the second, third and fourth positions, the second, third and fourth resistors are added parallel with the first resistor, and in the fifth position the shunt line is added in parallel with the four resistors to effectively shunt them out.

In accordance with another very important feature of the invention when the golf cart is switched into reverse to operate the motor in the reverse direction, the shunt line is automatically disconnected from the circuit. Therefore, in the event the operator inadvertently depresses the accelerator pedal to the floor while in reverse, the golf cart will not lurch backwards. In fact when the accelerator pedal is fully depressed, to place the power slide bar in the position corresponding to the fifth forward speed, the speed of the golf cart is actually reduced.

Other features of novelty of the present invention will specifically be pointed out or will otherwise become apparent when referring, for a better understanding of the invention, to the following description taken in conjunction with the accompanying drawings.

DESCRIPTION OF THE PREFERRED EMBODIMENT

Figure 1:
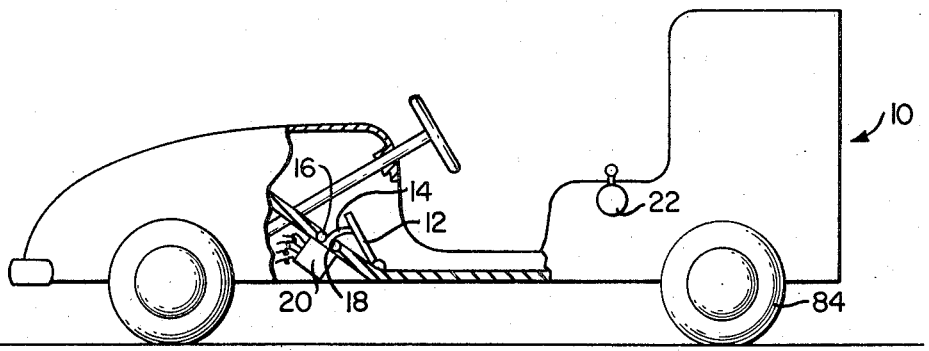
FIG. 1 is a side view partially broken away of a golf cart equipped with a speed control device of the present invention.

Referring to FIG. 1 a conventional battery powered golf cart 10 is shown which is equipped with a speed control device illustrating one embodiment of the invention. The accelerator pedal 12 is pivotally connected to a power slide bar 14 which is guided through an opening in the floor of the golf cart by two bearings 16 and 18. The free end of the power slide bar projects into and forms part of an electric switch 20 mounted on the underside of the floor for controlling the speed of the golf cart. A three position switch 22 having neutral, forward and reverse positions is mounted on the side of the cart for controlling the direction of movement of the golf cart 10.

Figure 2:
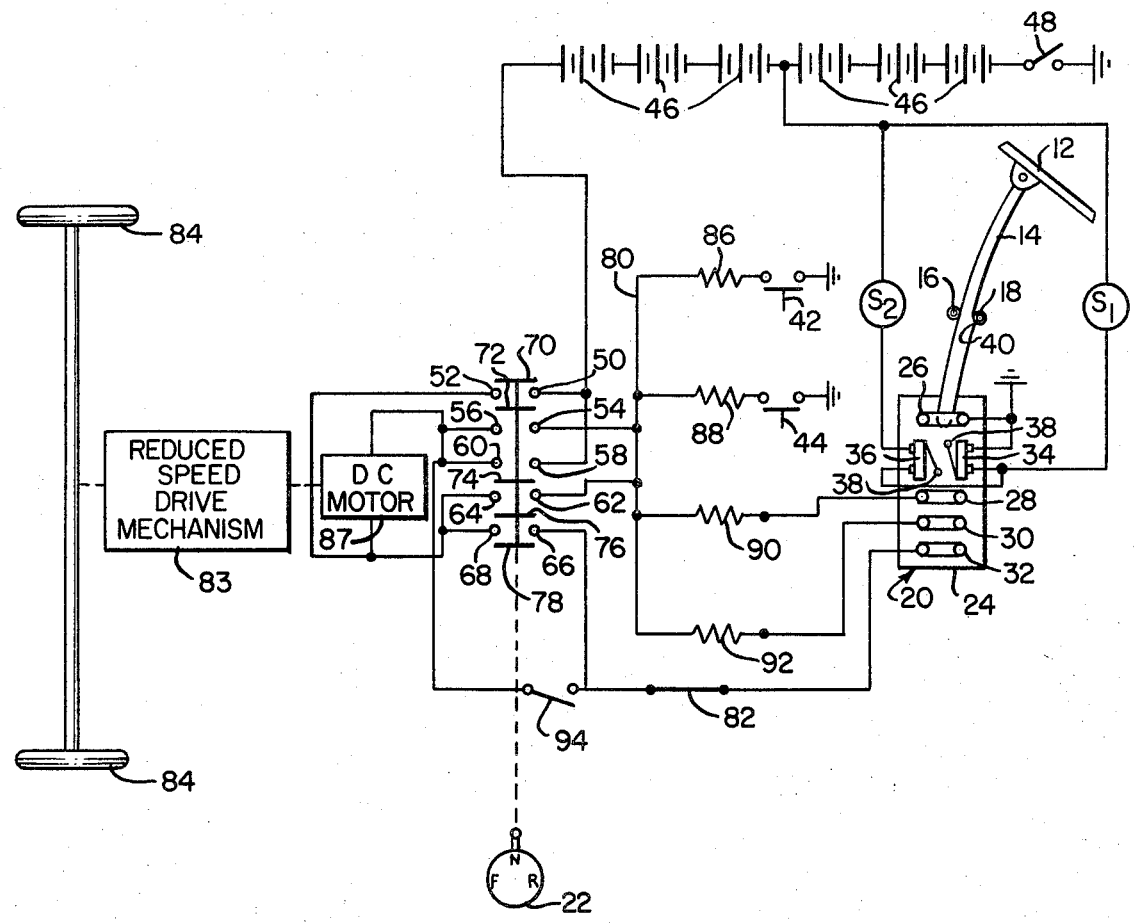
FIG. 2 is a schematic view of the control device with some components of the accelerator pedal controlled switch illustrated in their actual form.

Referring to FIG. 2, the speed control switch 20 (with its housing removed) and the manner in which the power slide bar 14 co-operates therewith is shown in greater detail. The switch 20 comprises a base 24 of insulating material having four pairs of contact assemblies 26-32 mounted thereon. The power slide bar 14 is shown in the position to which it normally is spring biased before the accelerator pedal 12 is depressed. In this position the end of the bar 14 is positioned between the contact plates of the contact assembly 26 so that the power slide bar 14 is connected to ground, as illustrated.

Two micro switches 34 and 36 are mounted on the base 24 between the contact assemblies 26 and 28. Each of the micro switches have rollers 38 on the ends of the actuating arms thereof which are positioned so that the roller associated with the micro switch 34 is actuated by the power slide bar before the roller 38 associated with the micro switch 36 is actuated. Therefore, as the accelerator pedal is depressed it first actuates the micro switch 34 and thereafter actuates the micro switch 36 and thereafter sequentially engages the contact assemblies 28, 30 and 32.

A shoulder 40 is formed on the power slide bar 14 in position to release the first roller 38 to de-activate the micro switch 34 just as the end of the power slide bar 14 engages the last contact assembly 32. With this construction the speed control switch 20 produces five different speeds for the golf cart. The first speed is produced when accelerator pedal 12 is depressed far enough to actuate the micro switch 34. The second speed when the micro switch 36 is actuated and the third, fourth and fifth speeds when the accelerator pedal is depressed far enough to engage the power slide bar 14 with the contact assemblies 28-32, respectively.

The micro-switches 34 and 36 control solenoid coils S1 and S2, respectively. The solenoid coils in turn control solenoid contacts 42 and 44, respectively. One side of each of the solenoid coils is connected to the mid point of six conventional series connected six volt batteries 46 so that eighteen volts is applied to the solenoid coils when the micro switches 34 and 36 are closed.

One end of the series connected batteries is connected to ground through a conventional key controlled ignition switch 48. The other end of the batteries is connected to contacts 50 and 58 of the switch 22 which controls the direction of the vehicle.

The switch 22 control five contact bars 70-78 positioned to co-operate with contacts 50-68. In the position illustrated, which is the neutral position, the contact bars 70-78 do not engage any of the contacts. When the switch 22 is pivoted in a counterclockwise direction to the forward position F, the contact bar 74 engages the contacts 58 and 60, the contact bar 76 engages the contacts 62 and 64 and the contact bar 78 engages the contacts 66 and 68. In this position a shunt bar 80 and a shunt line 82 are connected to one side of the DC motor 81 of the golf cart and the batteries 46 are connected to the other side of the DC motor.

Therefore, assuming the ignition switch 48 is closed, the golf cart motor will be energized in a forward direction to drive the golf cart in a forward direction, the motor being drivingly connected to the rear wheels 84 of the golf cart through a reduced speed drive mechanism 83 in a conventional manner.

When the accelerator pedal 12 is depressed to the first speed position, the micro switch 34 is tripped closed to energize the solenoid coil S1 and close the contacts 42 to connect a first resistor 86 between ground and the shunt bar 80. This connects the resistor 86, DC motor and batteries 46 in a series circuit so that 36 volts is applied to the motor with the current flow being determined by the size of the resistor 86. The resistor 86 is preferably sufficiently large so that the current flow to the motor is not enough to move the golf cart. Therefore, the operator of the vehicle will not hold the accelerator pedal in this position but will continue to depress it to the second speed position wherein the microswitch 36 is activated to close the contacts 44.

When the contacts 44 are closed a resistor 88 is connected in parallel with the resistor 86 to increase current flow to the DC motor and increase the speed of the vehicle. In this position the total current is divided between the resistors 86 and 88 to prevent overheating.

When the accelerator pedal is depressed to its third position to engage the power slide bar 14 with the contact assembly 28, a third resistor 90 is connected in parallel with the resistors 86 and 88 to further reduce the total resistance in series with the motor and thus increase the speed of the motor. In the third speed position the end of the resistor 90 not connected to the shunt bar 80 is connected to ground through the contact assembly 28, the power slide bar 14 and the contact assembly 26.

In the fourth speed position, the power slide bar 14 engages the contact assembly 30 and a fourth resistor 92 is connected in parallel with the first three resistors to further reduce the resistance in series with the motor and further increase the speed of the golf cart. In the fifth speed position, the slide bar 14 engages the contact assembly 32, and the shunt line 82 is connected in parallel with the four resistors 86-92 so as to effectively shunt them out of the circuit and operate the DC motor at its maximum speed.

In the fifth speed position, the micro switch 34 is tripped open as previously described because the roller 38 on the actuating arm thereof drops over the shoulder 40 on the power slide bar. This de-energizes the solenoid S1 and opens the contact 42. It will be observed, that the micro switch 36 is electrically interlocked with the micro switch 34 so that the circuit to the micro switch 36 is also interrupted when the micro switch 34 is tripped open to de-energize the solenoid S2 and open the contacts 44.

Opening the contacts 42 and 44 takes the resistors 86 and 88 out of the circuit. However, this has substantially no effect on the speed of the motor since the shunt line is connected in the circuit, and therefore, the motor is operated at its maximum speed regardless of whether the resistors 86 and 88 are in the circuit. By de-energizing the solenoids S1 and S2 in the fifth or high speed position, an un-necessary drain on the batteries 46 is eliminated.

Another important advantage of the control device, as described thus far, results from the fact that the third, fourth and fifth speeds of the motor are obtained by connecting the resistor 90, the resistor 92 and the shunt line 82, directly to ground through the power slide bar 14. With this construction, if the battery voltage should drop below the voltage required to energize the solenoids S1 and S2, the golf cart can still be operated in the third, fourth and fifth speed positions. In prior art solenoid operated golf carts, whenever the battery voltage drops to a point where the solenoids can no longer be energized, the golf cart is completely disabled and must be towed in. In the same situation, a golf cart equipped with the speed control of the present invention would simply lose the first and second speeds controlled by the solenoids S1 and S2, but the third, fourth and fifth speeds would still be available to drive the vehicle. Further, the absence of the first and second speeds provided by the resistors 86 and 88 provides an indication that the batteries are low and should be recharged.

When the direction switch 22 is pivoted in a clockwise direction to the reverse position R, the contact bar 70 engages the contacts 50 and 52 and the contact bar 72 engages the contacts 54 and 56. The remaining contact bars 74, 76 and 78 do not engage any contacts. In this reverse position the bar 80 is connected to the motor through the contacts 54 and 56, and the series connected batteries 46 are connected to the motor through the contacts 50 and 52. With this arrangement, the direction of current flow through the motor is reversed so that the golf cart will be driven in reverse.

When the accelerator pedal 12 is depressed, the first, second, third and fourth speeds are obtained as previously described. However, when the accelerator pedal is fully depressed to engage the power slide bar 14 with the contact assembly 32, the shunt line 82 is not connected in the circuit because the contact bar 78 does not engage the contacts 66 and 68. In this fully depressed position, however, the micro switch 34 is still tripped open, as previously described, to de-activate both solenoids S1 and S2. Therefore, only the resistors 90 and 92 will be connected in circuit in the fifth speed position. By selecting the proper values for the resistors 90 and 92 relative to the resistors 86 and 88, the speed in reverse at this fully depressed accelerator position can actually be made as slow or slower than the first four speed positions. This provides an important safety feature because fully depressing the accelerator pedal in the reverse position will not result in lurching backwards, but only in moving backwards at a slow speed determined by the values of the resistors 90 and 92. In contrast with this, when prior art golf carts are placed in reverse, and the accelerator pedal is fully depressed the golf carts operate at the same maximum speed as in the forward direction. Many accidents are caused by this high speed reverse position, particularly when inexperienced operators are maneuvering the golf carts in congested areas.

A manually controlled switch 94 is provided so that the operator can connect the shunt line 82 to the motor in the reverse position of the switch 22. This enables full power to be supplied to the motor in reverse in case the golf car must be backed up a steep hill, or a steep ramp leading to a storage area.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A speed control device for an electric motor driven vehicle comprising a plurality of resistors, a solenoid, a control switch connected to energize said solenoid, and circuit means for electrically connecting said resistors between a source of DC power and the motor of said vehicle, said circuit means including contact switch means having at least first, second and final positions, said switch means in said first position actuating said control switch to energize said solenoid, said circuit means connecting a first resistor circuit with said motor and power source when said solenoid is energized, said switch means in said second position connecting a second resistor in parallel with said first resistor, said switch means in said final position shunting said resistors to connect said motor directly via a shunt line to said power source and actuating said control switch to de-energize said solenoid whereby the motor receives full power in said final position without current being drained off by said solenoid, and said switch means actuatable to a third position between said second and final positions, and including a third resistor and a reverse switch, said circuit means connecting said third resistor in parallel with said first and second resistors when said switch means is in said third position, said circuit means reversing the direction of rotation of said motor and breaking the circuit to said shunt line whenever said reverse switch is actuated whereby said motor will be operated at a speed determined by said second and third resistors connected in parallel when said reverse switch is actuated and said switch means is in said final position.

2. The invention as defined in claim 1 including an override switch for shunting the break in the circuit to said shunt line produced by said reverse switch.

3. The invention as defined in claim 1 including an operator driven vehicle having said DC power source, motor and speed control device mounted thereon for propelling the vehicle at a speed determined by said speed control device.

4. A speed control device for an electric motor driven vehicle comprising a plurality of resistors, a solenoid, a control switch connected to energize said solenoid, and circuit means for electrically connecting said resistors between a source of DC power and the motor of said vehicle, said circuit means including contact switch means having at least first, second and final positions, said switch means in said first position actuating said control switch to energize said solenoid, said circuit means connecting a first resistor circuit with said motor and power source when said solenoid is energized, said switch means in said second position connecting a second resistor in parallel with said first resistor, said switch means in said final position shunting said resistors to connect said motor directly to said power source and actuating said control switch to de-energize said solenoid whereby the motor receives full power in said final position without current being drained off by said solenoid, and a third resistor, a second solenoid, and a second control switch connected to energize said second solenoid, and wherein said switch means is actuatable to a third position between said first and second positions, said switch means in said third position actuating said second control switch to energize said second solenoid, said circuit means connecting said third resistor in parallel with said first resistor when said second solenoid is energized, said first and second control switches being electrically interlocked so that actuation of said first control switch in said final position de-energizes both of said solenoids.

* * * * *